United States Patent
Eisner et al.

(10) Patent No.: US 7,054,611 B2
(45) Date of Patent: May 30, 2006

(54) SYSTEM AND METHOD FOR PROVIDING MOBILE CALLER INFORMATION TO A SPECIAL NUMBER SERVICE STATION

(75) Inventors: Gerald Eisner, Naperville, IL (US); Mark Clinton Knox, Lafayette, CO (US)

(73) Assignee: Intrado Inc., Longmont, CO (US)

( * ) Notice: Subject to any disclaimer, the term of this patent is extended or adjusted under 35 U.S.C. 154(b) by 0 days.

(21) Appl. No.: 10/402,739

(22) Filed: Mar. 29, 2003

(65) Prior Publication Data
US 2004/0192271 A1    Sep. 30, 2004

(51) Int. Cl.
*H04M 11/04* (2006.01)

(52) U.S. Cl. ............................... 455/404.1; 379/45
(58) Field of Classification Search ............. 455/404, 455/456.1, 456.2, 456.3, 415, 414.1, 404.1; 379/37, 38, 39, 40, 45, 41, 42, 43
See application file for complete search history.

(56) References Cited

U.S. PATENT DOCUMENTS

| | | | |
|---|---|---|---|
| 6,064,722 A * | 5/2000 | Clise et al. | 379/37 |
| 6,587,545 B1 * | 7/2003 | Antonucci et al. | 379/37 |
| 6,697,783 B1 * | 2/2004 | Brinkman et al. | 705/3 |

* cited by examiner

*Primary Examiner*—Fan Tsang
*Assistant Examiner*—Olisa Anwah
(74) *Attorney, Agent, or Firm*—Michael B. Johannesen

(57) ABSTRACT

A system for providing particular information relating to a caller placing a call from a mobile calling instrument to a special number service station in a telecommunication network includes: (a) an information store for storing a body of information including the particular information identified as relating to the caller; and (b) an interface unit communicatingly coupled at least with the information store and the special number service station. The interface unit responds to a query identifying the calling instrument from the special number service station by retrieving the particular information from the information store and communicating the particular information to the special number service station.

10 Claims, 2 Drawing Sheets

SYSTEM AND METHOD FOR PROVIDING MOBILE CALLER INFORMATION TO A SPECIAL NUMBER SERVICE STATION

BACKGROUND OF THE INVENTION

The present invention is directed to telecommunication networks, and especially to telecommunication networks involving calls from mobile calling instruments to special number service stations. An example of such a call from a mobile calling instrument to a special number service station is a call from a cellular phone, from a Voice over Internet Protocol (VoIP) calling instrument or from another wireless or otherwise mobile device to an emergency service station such as a Public Safety Answering Point (PSAP) in an emergency service call system.

An emergency service call system, commonly known in the United States as an E9-1-1 System, will be employed herein as an exemplary preferred embodiment of the present invention. Other special number systems are deployed and would benefit from the present invention. Examples of such other special number systems include (by way of example and not by way of limitation) non-emergency police or fire call systems, telephone network maintenance call systems and commercially established special numbers (e.g., "dial 'GOTIX' on your AT&T Wireless phone for tickets").

A basic 9-1-1 (Emergency Services) System provides for programming with special 9-1-1 software a telephone company end office (also known as a "central office" or a "Class 5 office") to route all 9-1-1 calls to a single destination. The single destination is termed a Public Safety Answering Point (PSAP). In such an arrangement, all telephones served by the central office would have their 9-1-1 calls completed to the PSAP. However, the areas served by respective telephone company central offices do not line up with the political jurisdictions that determine the boundaries for which PSAP may be responsible. That is, a municipal fire department or police department may geographically include an area outside the area served by the central office, a condition known as underlap. Likewise, the municipal fire or police department may encompass an area of responsibility that is less expansive than the area served by the central office, a situation known as overlap. Further, the original basic 9-1-1 systems did not provide any identification of the caller; the PSAP human operator had to obtain such information verbally over the line after the call was connected. The major shortcoming of the basic 9-1-1 systems was that they could not support interconnection to other telecommunication providers such as independent telephone service companies, Alternate Local Exchange Carriers (ALECs), or wireless carriers. The "basic" nature of the basic 9-1-1 system also indicates that the system does not have Automatic Location Information (ALI) capability or Automatic Number Identification (ANI) capability with a call back capability.

Similar abbreviated number systems are in place for handling emergency service calls in countries other than the United States. The abbreviated number system established in Canada is the foreign system most similar to the system established in the United States. There are other abbreviated number calling systems in place in the United States and abroad for such purposes as handling municipal information and services calls (3-1-1) and for other purposes. All of these special or abbreviated number call systems that have geographic-based content suffer from similar shortcomings in their abilities to automatically place incoming calls to an action-response facility geographically proximate to the locus of the caller. It is for this reason that the 9-1-1 emergency call system of the United States is employed for purposes of this application as a preferred embodiment of the system and method of the present invention.

Automatic Number Identification (ANI) is a feature for 9-1-1 services that allows the caller's telephone number to be delivered with the call and displayed at the PSAP. This ANI feature is sometimes referred to as Calling Party Number (CPN). The feature is useful for identifying the caller and, if the caller cannot communicate, for callback. A signaling scheme known as Centralized Automatic Message Accounting (CAMA), originally used to identify the originator of a long distance call for billing purposes, was adapted to facilitate ANI delivery to the PSAP.

The availability of the caller's telephone number to the PSAP (the ANI feature) led quickly to providing the caller's name and address as well. This was straightforwardly accomplished using the subscriber information stored by telephone companies based upon telephone number since the 1980's. New equipment at the PSAP enabled queries of an Automatic Location Information (ALI) database using the caller's number provided by the ANI feature to ascertain name and address information. The ALI databases are typically maintained by the respective telephone company serving the PSAP. This was an improvement, but a problem still remained where several telephone company central offices served a town or county. Other problems also developed with the growing volume of mobile callers using wireless phones, satellite phones and communications over the Internet. Information regarding the locus of the origin of the call merely identified the locus where the call entered the wireline network; even such limited location information is not always provided. No indication was presented to identify the geographic location of such mobile callers.

As the situation of multiple central offices serving a PSAP occurred more frequently, it was clear that it was inefficient to build communication trunks from several central offices to a PSAP. As a result the 9-1-1 Tandem was developed. With that equipment, trunks from central offices are concentrated at a tandem office (a 9-1-1 Tandem) from which a single trunk group serves a given PSAP. Often a 9-1-1 tandem comprises an otherwise common Class 5 telephone system end office (EO), with added software to configure it for 9-1-1 operations. Such concentration of trunks reduces size and cost of PSAP equipment. The tandem is a telephone company switch that provides an intermediate concentration and switching point. Tandems are used for many purposes, including intra-LATA (Local Access and Transport Area) toll calls, access to other local exchange carriers (LECs), and access to long distance carriers and telephone operators.

A significant development in 9-1-1 services has been the introduction of Enhanced 9-1-1 (E9-1-1). Some of the features of E9-1-1 include Selective Routing, ANI, ALI, Selective Transfer and Fixed Transfer. Selective Transfer enables one-button transfer capability to Police, Fire and EMS (Emergency Medical Service) agencies appropriate for the caller's location listed on the ALI display. Fixed Transfer is analogous to speed dialing. Enhanced 9-1-1 services also permit provisioning supplemental data or information regarding calling parties, such as allergies to medications, presence of pets, infants or handicapped persons at the premises or similar information useful to responding to emergency service personnel.

Selective Routing is a process by which 9-1-1 calls are delivered to a specific PSAP based upon the street address of the caller. Selective Routing Tandems do not directly use address information from the ALI database to execute decisions regarding which PSAP to connect. Recall that emergency services (Police, Fire and EMS) are typically delivered on a municipality basis. Often there will be one Police Department (e.g., municipal, county or state), but there may be several Fire Departments and EMS Agencies. The town will be divided into response areas served by each respective agency. The response areas are overlaid and may be defined as geographic zones served by one particular combination of Police, Fire and EMS agencies. Such zones are referred to as Emergency Service Zones (ESZ). Each ESZ contains the street addresses served by each type of responder. The ESZs are each assigned an identification number (usually 3–5 digits), known as Emergency Service Numbers (ESN).

The Assignment of ESZs and corresponding ESNs enables the compilation of selective routing tables. The street addresses are derived from a Master Street Address Guide (MSAG), a database of street names and house number ranges within associated communities defining Emergency Service Zones (ESZs) and their associated Emergency Service Numbers (ESNs). This MSAG enables proper routing of 9-1-1 calls by the 9-1-1 Tandem; this is Selective Routing as implemented in an E9-1-1 system. Thus, the telephone company must have an MSAG valid address to be assigned the appropriate ESN for selective routing purposes and that information must be added to the E9-1-1 ALI database. It is by using such information that the selective routing capability of the Selective Routing Tandem can properly route an E9-1-1 call to the correct PSAP. If the information is not available in the ALI database, the record is placed into an error file for further manual handling.

A portion of the ALI database may be loaded into a Selective Routing Data Base (SRDB) for use by the 9-1-1 Tandem. The SRDB may be located in the Tandem, in an adjunct processor, or in the ALI database.

Reliability is a very important factor considered in designing 9-1-1 systems. One approach to providing reliability is to provide diversely routed trunk groups from each central office to its respective 9-1-1 Tandem. Preferably, each trunk group is large enough to carry the entire 9-1-1 traffic load for the respective central office. However, some systems are designed with less than full traffic capacity on trunk groups to "choke" or "congestion manage" incoming calls to a tandem in order to avoid overloading a PSAP. In some arrangements, parallel 9-1-1 Tandems are provided so that a central office has capable 9-1-1 Tandem ready for use (albeit with 50% call handling capacity) without interruption if one of the 9-1-1 Tandems fails. Switched bypass to an alternate 9-1-1 Tandem, commonly using digital crossover switches, is another approach to providing reliability in 9-1-1 systems.

Another approach to providing redundancy and robustness for a 9-1-1 system is the employment of Instant Network Backup (INB). Using INB, if a call does not complete to the 9-1-1 network for any reason (e.g., trunk failure, facility problem, 9-1-1 Tandem failure or port failure), the INB takes over and completes the call to a predesignated 7- or 10-digit number. Using this INB alternate path, ANI and ALI information are not delivered, but the call is completed to a local public safety agency, usually the local PSAP.

The interface between Operator handled calls and a 9-1-1 system is addressed in several ways. One system provides a direct connection between an Operator Tandem and the 9-1-1 Tandem. The operator forwards the call with the caller's ANI to the 9-1-1 Tandem. The 9-1-1 Tandem treats the call as though the caller had dialed the call. A second way to effect the desired interface is by using pseudo numbers. A pseudo number is a number that, when dialed, will reach a specific PSAP as a 9-1-1 call. Pseudo numbers have some special ALI information associated with them; for example, there may be a pseudo number associated with each municipality in a state. Dialing the pseudo number, usually from outside the LATA (Local Access and Transport Area), will generate a 9-1-1 to the PSAP for that municipality. The ALI display will indicate that it is a third party conference call from an unknown address in that town. The caller is not identified, but the call goes to the PSAP where the caller is believed, or claims, to be. Pseudo numbers are useful for Alternate Local Exchange Carrier (ALEC) or Competitive Local Exchange Carrier (CLEC) operators who may be located anywhere in the country.

A third method for effecting an interface for operator handled calls with a 9-1-1 system is through the Public Switched Telephone Network (PSTN), dialing the directory number for the PSAP. This is often referred to as the "back door" number by ALEC and CLEC operators.

The advent of wireless communications and other mobile phone capabilities (e.g., VoIP phones) has further exacerbated the difficulty of ascertaining caller location in telecommunication systems. The "patchwork" solutions described above regarding 9-1-1 systems have been mirrored in other special or abbreviated number systems to a significant extent. The "patchwork" solutions have created a capability-limited telecommunication system that cannot ascertain geographic information as fully or as easily as it should for all types of callers. This capability limitation has been especially felt in connection with calls made from mobile telephone instruments. The system is overly dependent upon human intervention to properly route calls to appropriate receivers, such as a proper PSAP. New modes of communication, such as Voice Over Internet Protocol (VoIP) and wireless communication instruments including wireless phones, wireless Personal Computers (PCs), wireless Personal Digital Assistant (PDA) devices and other mobile instruments, further contribute to telecommunication traffic not identifiable regarding geographic origin using present telecommunication routing systems.

Similar limitations will likely occur in other abbreviated number, or other special number, telephone systems handling location-based calls with resulting adverse limitations. Other such abbreviated number systems include emergency call systems in countries other than the United States, abbreviated number calling systems for reaching telephone maintenance services, abbreviated number calling systems for municipal information and services, and similar systems.

Provisioning of supplemental information to a special number service station (e.g., a PSAP in an emergency service call system) regarding a call originating from a mobile calling instrument is particularly difficult. Even with precise location information regarding locus of the origin of the call, such as would be available, for example, when the calling instrument has a Global Positioning System (GPS) capability, does not fulfill the need for availability of supplemental information regarding the calling party. Such supplemental information may include (by way of example and not by way of limitation) medical needs of the caller like allergies to medicines, or a request to notify specified personnel in the case of an emergency, or other information unique to the calling party that may be useful to responding emergency personnel. Other wireless systems, such as Automatic Collision Notification systems (ACN; one such system is referred to as ONSTAR™) may find it useful to alert responding emergency personnel that an infant or an invalid may be in an automobile involved in an accident. No systems are presently available to effect provisioning such supplemental information to a responding service station (e.g., a PSAP) for mobile instrument-originated calls. Mobile instrument-originated calls may include mobile telephone devices, wireless Personal Computers (PCs), wireless Personal Digital Assistant devices (PDAs), pager devices and other wireless-communication capable devices, whether capable of one-way or two-way communication. The present invention is also beneficial for other calling equipment having no particular fixed position, such as Voice over Internet Protocol phone devices (VoIP phones).

There is a need for a system and method for providing particular information relating to a caller placing a call from a mobile calling instrument to a special number service station in a telecommunication network.

SUMMARY OF THE INVENTION

A system for providing particular information relating to a caller placing a call from a mobile calling instrument to a special number service station in a telecommunication network includes: (a) an information store for storing a body of information including the particular information identified as relating to the caller; and (b) an interface unit communicatingly coupled at least with the information store and the special number service station. The interface unit responds to a query identifying the calling instrument from the special number service station by retrieving the particular information from the information store and communicating the particular information to the special number service station.

A method for providing particular information relating to a caller placing a call from a mobile calling instrument to a special number service station in a telecommunication network includes the steps of: (a) providing an information store for storing a body of information including the particular information identified as relating to the caller; (b) providing an interface unit communicatingly coupled at least with the information store and the special number service station; (c) operating the interface unit to respond to a query identifying the calling instrument from the special number service station by retrieving the particular information from the information store; and (d) communicating the particular information to the special number service station.

It is, therefore, an object of the present invention to provide a system and method for providing particular information relating to a caller placing a call from a mobile calling instrument to a special number service station in a telecommunication network.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
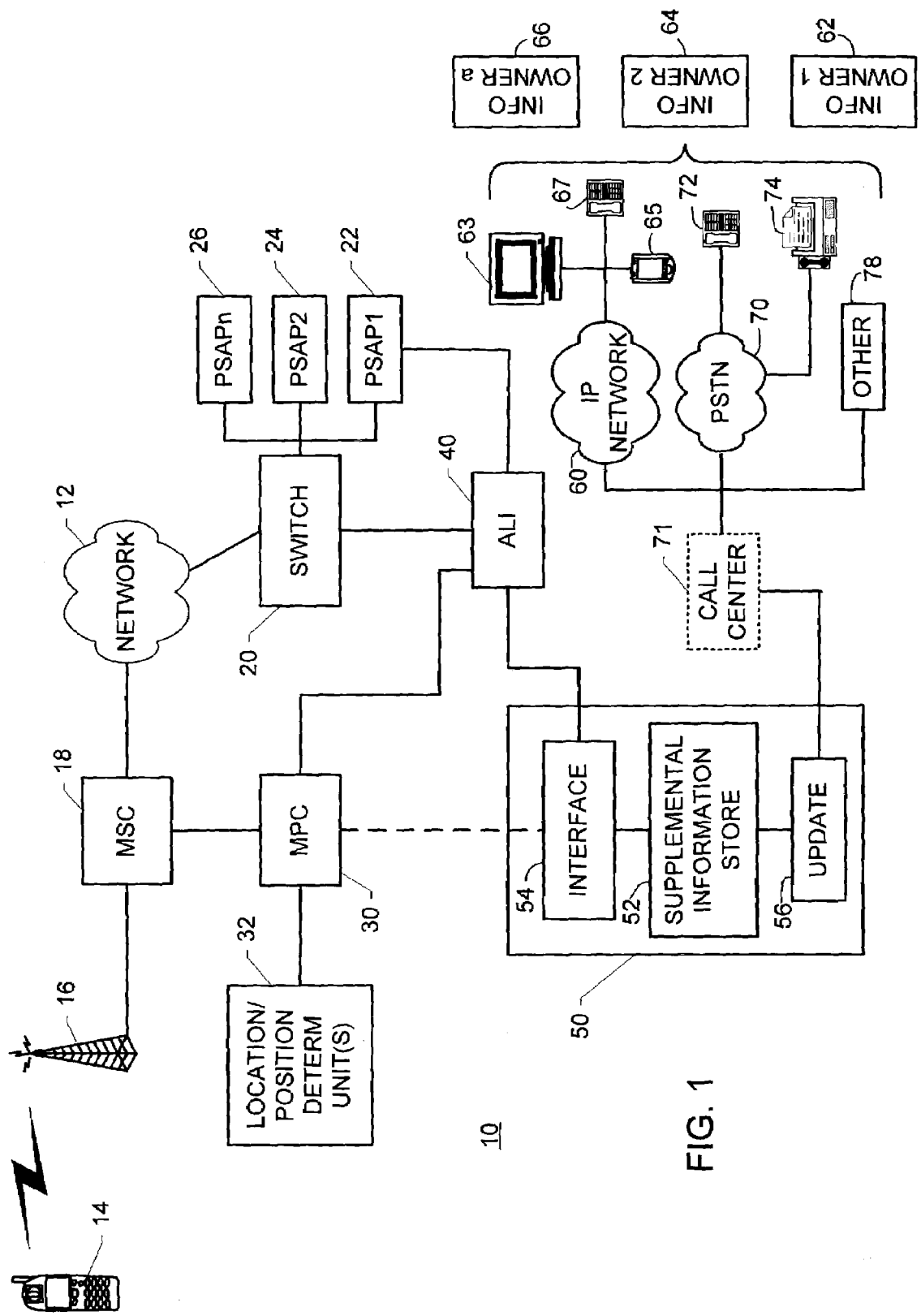
FIG. 1 is a simplified schematic diagram illustrating the preferred embodiment of the system of the present invention.

FIG. 1 is a simplified schematic diagram illustrating the preferred embodiment of the system of the present invention. In FIG. 1, a telecommunication arrangement 10 includes a network 12 for effecting telecommunications among callers and called parties. A mobile calling instrument 14 is wirelessly coupled with a transceiving tower 16. Mobile calling instrument 14 is represented in FIG. 1 as a cellular phone, but may as well be any of several mobile calling instruments such as, by way of example and not by way of limitation, wireless Personal Computers (PCs), wireless Personal Digital Assistant devices (PDAs), pager devices and other wireless-communication capable devices, whether capable of one-way or two-way communication, and other calling equipment having no particular fixed position, such as Voice over Internet Protocol phone devices (VoIP phones).

Transceiving tower 16 is coupled with a mobile switching center 18. Mobile switching center 18 recognizes the call received from mobile calling instrument 14 as a special number call (e.g., an emergency service E9-1-1 call) and conveys the special number call via network 12 to a telecommunication switch 20. Network 12 may be embodied in a Public Switched Telephone Network (PSTN) or in another network, including private networks and Internet Protocol (IP) networks, such as the Internet. Mobile calling instrument 14 may access a network such as an Internet Protocol network without involving transceiving tower 16 or mobile switching center 18. Switch 20 may be a specialized switch configured especially for handling special number calls. An example of such a switch is a 9-1-1 Tandem for handling E9-1-1 emergency service calls in the United States. It is such an emergency service call that is employed in this disclosure as a preferred embodiment exemplary of the system and method of the present invention. However, other special number calls are intended as being within the scope of the present invention.

Switch 20 couples the call received from mobile calling instrument 14 via network 12 with one or more special number service stations 22, 24, 26. Special number service stations 22, 24, 26 are embodied in public safety answering points PSAP1, PSAP2, PSAPn in exemplary emergency service E9-1-1 telecommunication arrangement 10 illustrated in FIG. 1. Mobile switching center 18 is also preferably coupled with a mobile positioning center 30. Mobile positioning center 30 is coupled with at least one location/position determining unit(s) 32. Part of the call information received from mobile calling instrument 14 by mobile switching center 18 preferably includes position indicating information that may employ, by way of example and not by way of limitation, Global Positioning System (GPS) information or other position-indicating information that relates to the locus of mobile calling instrument 14. Mobile positioning center 30 and location/position determining unit(s) 32 cooperate to employ position indicating information received from mobile switching center 18 to provide to mobile switching center 18 an indication of the locus of mobile calling unit 14. The locus may be indicated in a latitude-longitude format or in another format. The locus indicating information may be included in call information (e.g., call set-up or call routing information) that accompanies calls traversing network 12 in order to aid network 12 in determining which switch 20 to which to route the extant call. Locus indicating information may also be employed by switch 20 to select which special number service station 22, 24, 26 should receive the extant call. It is important to route the extant call to an appropriate special number service station 22, 24, 26 (e.g., PSAP1, PSAP2, PSAPn) for providing the service requested by the extant call. In the exemplary call system illustrated in FIG. 1, PSAP1 is the appropriate recipient of the extant call placed by mobile calling instrument 14, based upon the locus of mobile calling instrument 14.

PSAP1 is coupled with an Automatic Location Information (ALI) unit 40 and communicates with ALI unit 40 to ascertain location and other information relating to any caller associated with the locus of mobile calling instrument 14. ALI units in land line calling scenarios involving E9-1-1 calling typically contained stored information relating to address of the location of the calling instrument and other supplemental information relating to the locus of the calling instrument. Supplemental information in such land line E9-1-1 systems typically included details regarding such things as allergies suffered by residents at the calling instrument locus, pets or infants or invalids residing at the calling instrument locus, or other details that could be useful to responding emergency service personnel. The present invention fulfills a need for supplemental information availability to responding special number service stations, such as PSAPs, that has heretofore been unavailable for mobile calling instruments.

A supplemental information store apparatus 50 is coupled with ALI unit 40. Supplemental information store apparatus 50 includes a supplemental information store 52 in which information is stored in a manner that is retrievable according to individual callers. Supplemental information store 52 is coupled with an interface unit 54. Interface unit 54 is preferably coupled with ALI unit 40 and responds to queries posed by PSAP1 to ALI unit 40 or relayed by ALI unit 40 to provide supplemental information stored in supplemental information store 52 for a caller identified in the extant query. Identification of the caller is preferably effected using phone number information or call routing information or a combination of such identifying information. ALI unit 40 is coupled with mobile positioning center 30 so that responses provided by ALI unit 40 to PSAP1 may include locus indicating information relating to mobile calling instrument 14, if desired. Alternatively, interface unit 54 may be coupled with mobile positioning center 30 so that responses provided to ALI unit 40 may include locus indicating information relating to mobile calling instrument 14, if desired. The alternate nature of this connection between interface unit 54 and mobile positioning center 30 is indicated by a dotted line 58 coupling interface unit 54 and mobile positioning center 30. Another alternative permits interface unit 54 to be coupled directly with PSAP1 (or other PSAPs) directly without including a connection with ALI unit 40. It is preferred that the coupling arrangement shown in FIG. 1 be employed to take advantage of already existing connections between PSAPs and ALI units in emergency service systems in the United States.

Information for storing in supplemental information store 52 is provided to supplemental information store 52 via an update interface unit 56. Using update interface unit 56, information entries and updates may be provided for supplemental information store 52 current using any of a variety of communication milieux. Thus, by way of example and not by way of limitation, information owners 62, 64, 66 may deliver information to supplemental information store 52 via update interface unit 56 using an Internet Protocol network such as the Internet 60, via a Personal Computer (PC) entering information into a website or via e-mail (not shown in detail in FIG. 1), using a wireless access device such as a Personal Digital Assistant (PDA) 65 or using a Voice over Internet Protocol (VoIP) phone 67. Alternatively, information owners 62, 64, 66 may deliver information to update interface unit 56 via a telecommunication network such as a Public Switched Telephone Network (PSTN) 70 using a telephone 72 or a facsimile instrument 74. Other communication venues 78 may also be employed to provide information for storing or updating in supplemental information store 52, such as via US. Mail or other communication means. A call center 71 may be provided to facilitate calls placed to update interface unit 56, if desired. The alternate nature of providing call center 71 is indicated in FIG. 1 by depicting call center 71 using a dotted line format.

Supplemental information store apparatus 50 is preferably a centrally located facility that can be accessed by special number service stations such as PSAP1 nationwide. Alternatively, supplemental information storage apparatus 50 may be embodied in distributed storage facilities that are updated from home storage facilities, similar to arrangements for storing visiting callers numbers in a Visitors' Location Register (VLR) maintained by a cellular telecommunication system for callers roaming in a coverage area.

Figure 2:
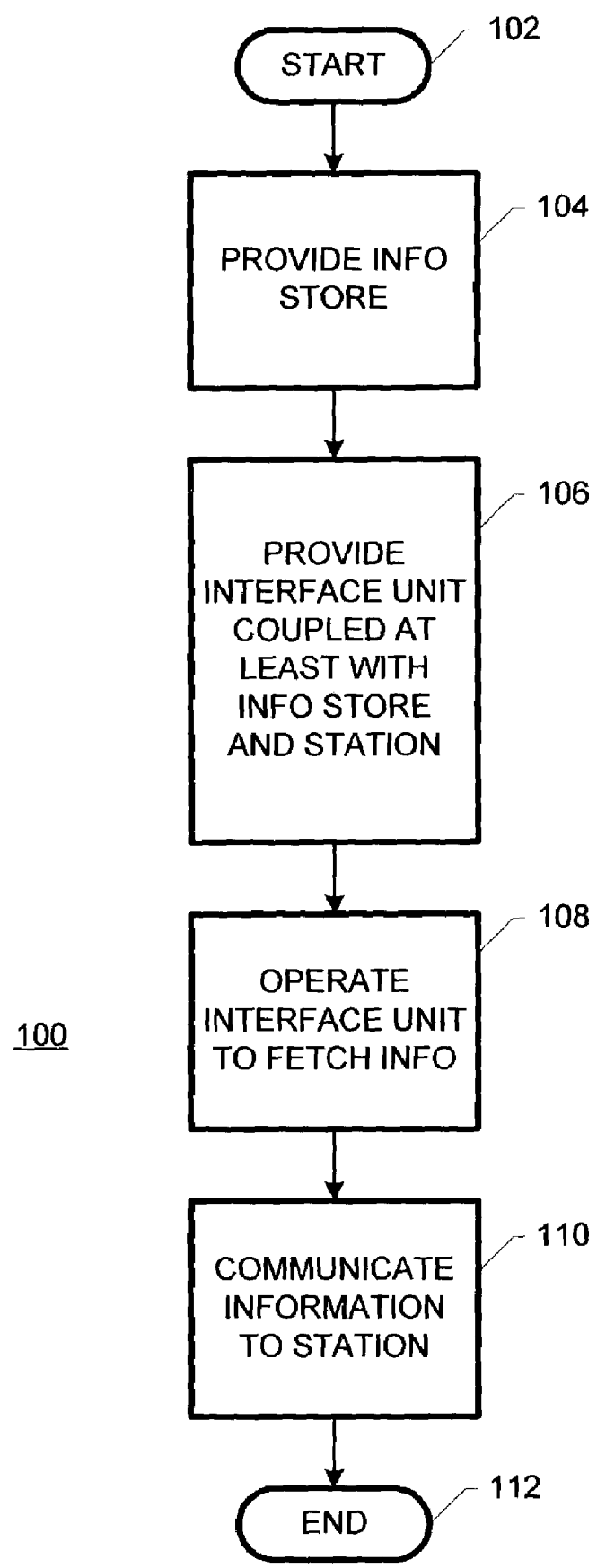
FIG. 2 is a flow chart illustrating the preferred embodiment of the method of the present invention.

FIG. 2 is a flow chart illustrating the preferred embodiment of the method of the present invention. In FIG. 2, a method 100 for providing particular information relating to a caller placing a call from a mobile calling instrument to a special number service station in a telecommunication network begins at a START locus 102. Method 100 continues with the step of providing an information store for storing a body of information, as indicated by a block 104. The body of information includes the particular information identified as relating to the caller. Method 100 continues with providing an interface unit communicatingly coupled at least with the information store and the special number service station, as indicated by a block 106. Method 100 continues with the step of operating the interface unit to respond to a query identifying the calling instrument from the special number service station by retrieving the particular information from the information store, as indicated by a block 108. Method 100 continues with communicating the particular information to the special number service station, as indicated by a block 110. Method 100 thereafter terminates at an END locus 112.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A method for providing supplemental information relating to a caller placing a call from a mobile calling instrument to a special number service station in a telecommunication network that includes a mobile position determining unit and an Automatic Location Information (ALI) unit communicatively coupled to said special number service station; the method comprising the steps of:

(a) providing an information store for storing a body of information; said body of information including said supplemental information relating to said caller;

(b) providing an interface unit communicatively coupled to said information store and said ALI unit;

(c) operating said interface unit to respond to a query identifying said calling instrument from said ALI unit by retrieving said supplemental information from said information store; and (d) communicating said supplemental information to said ALI unit;

(e) communicating said supplemental information to said special number service station from said ALI unit;

said interface unit being communicatively coupled with said mobile position determining unit and cooperating with said mobile position determining unit to include an indication of location of said calling instrument with said supplemental information.

2. A method for providing particular information relating to a caller placing a call from a mobile calling instrument to a special number service station in a telecommunication network as recited in claim 1 wherein:

said telecommunication network includes an emergency services special number call system and said special number service station is a public safety answering point.

3. A method for providing particular information relating to a caller placing a call from a mobile calling instrument to a special number service station in a telecommunication network as recited in claim 1, further comprising the step of:

(f) taken in no particular order with respect to steps (a), (b), (c), (d), or (e), providing an update interface unit communicatingly coupled with said information store and configured for receiving updates relating to said body of information via at least one communication milieu of a plurality of communication milieux.

4. A method for providing particular information relating to a caller placing a call from a mobile calling instrument to a special number service station in a telecommunication network as recited in claim 1 wherein said coupling between said interface unit and said special number service station is effected via an automatic location information facility.

5. A method for providing particular information relating to a caller placing a call from a mobile calling instrument to a special number service station in a telecommunication network as recited in claim 4, further comprising the step of:

(f) taken in no particular order with respect to steps (a), (b), (c), (d), or (e) providing an update interface unit communicatingly coupled with said information store and configured for receiving updates relating to said body of information via at least one communication milieu of a plurality of communication milieux.

6. A system for providing supplemental information relating to a caller placing a call from a mobile calling instrument to a special number service station in a telecommunications network, said system comprising:

an automatic location information (ALI) unit configured to store primary information and configured to provide primary and supplemental information to said special number service station responsive to a query identifying said mobile calling instrument;

an information store communicatively coupled to the ALI configured to store a body of information, including said supplemental information relating to the caller, and configured to provide said supplemental information to said ALI responsive to an ALI query identifying said mobile calling instrument;

a mobile positioning center communicatively coupled to the information store; and a location determining unit communicatively coupled to the mobile positioning center, the location determining unit configured to cooperate with the mobile positioning center to determine a location of the mobile calling instrument responsive to an information store query identifying said mobile calling instrument.

7. A system for providing supplemental information relating to a caller placing a call from a mobile calling instrument to a special number service station in a telecommunications network in accordance with claim 6 wherein the location determining unit comprises a plurality of location determining units communicatively coupled to one another and to said mobile positioning center, each of the plurality of location determining units configured to cooperate with the mobile positioning center and each other to determine a location of the mobile calling instrument responsive to an ALI query identifying said mobile calling instrument.

8. A system for providing supplemental information relating to a caller placing a call from a mobile calling instrument to a special number service station in a telecommunications network in accordance with claim 6 further comprising:

an update unit communicatively coupled with the information store and configured to received updates relating to said body of information via a plurality of communications systems.

9. A system for providing supplemental information relating to a caller placing a call from a mobile calling instrument to a special number service station in a telecommunications network in accordance wit claim 8 wherein the update unit is further configured to received updates from said caller via one of the plurality of communications systems.

10. A system for providing supplemental information relating to a caller placing a call from a mobile calling instrument to a special number service station in a telecommunications network in accordance with claim 6 wherein the special number service station comprises a public service answering point.

* * * * *